(12) United States Patent
Sowden et al.

(10) Patent No.: US 7,081,882 B2
(45) Date of Patent: Jul. 25, 2006

(54) DOCUMENT VIEWING DEVICE

(75) Inventors: Anthony Sowden, Bristol (GB); Russell David Gallop, Didcot (GB)

(73) Assignee: Hewlett-Packard Development Company, L.P., Houston, TX (US)

(*) Notice: Subject to any disclaimer, the term of this patent is extended or adjusted under 35 U.S.C. 154(b) by 363 days.

(21) Appl. No.: 10/186,756

(22) Filed: Jul. 1, 2002

(65) Prior Publication Data

US 2003/0020687 A1 Jan. 30, 2003

(30) Foreign Application Priority Data

Jul. 18, 2001 (GB) ................................. 0117543.9

(51) Int. Cl.
*G09G 5/00* (2006.01)

(52) U.S. Cl. ..................... 345/156; 345/701; 345/762
(58) Field of Classification Search .............. 345/701, 345/156, 739, 744, 853, 854, 848, 762, 765, 345/203, 473–475, 779, 157–164; 709/210, 709/217, 247; 455/550, 566; 348/207.2, 348/231, 239; 704/275, 270; 358/1.15, 358/1.16; 707/500, 1
See application file for complete search history.

(56) References Cited

U.S. PATENT DOCUMENTS

| | | | |
|---|---|---|---|
| 5,463,725 A | | 10/1995 | Henckel et al. |
| 6,073,136 A * | | 6/2000 | Bertram et al. .......... 707/104.1 |
| 6,160,536 A * | | 12/2000 | Forest ......................... 345/157 |
| 6,243,074 B1 * | | 6/2001 | Fishkin et al. ............... 345/156 |
| 6,281,881 B1 * | | 8/2001 | Siddiqui et al. ............. 345/164 |
| 6,297,805 B1 * | | 10/2001 | Adler et al. ................. 345/158 |
| 6,385,350 B1 * | | 5/2002 | Nicholson et al. ........... 382/309 |
| 6,539,359 B1 * | | 3/2003 | Ladd et al. .................. 704/275 |
| 6,577,315 B1 * | | 6/2003 | Kroitor ......................... 345/473 |
| 6,633,314 B1 * | | 10/2003 | Tuli .............................. 345/744 |
| 6,690,403 B1 * | | 2/2004 | Tuli .............................. 345/854 |
| 6,762,775 B1 * | | 7/2004 | Ho ............................... 715/776 |
| 6,903,723 B1 * | | 6/2005 | Forest ......................... 345/157 |
| 6,940,488 B1 * | | 9/2005 | Siddiqui et al. ............. 345/163 |

(Continued)

FOREIGN PATENT DOCUMENTS

JP 2000163193 6/2000

(Continued)

OTHER PUBLICATIONS

U.S. Appl. No. 09/715,845, filed Nov. 15, 2000, Yuasa, et al.

*Primary Examiner*—Vijay Shankar
*Assistant Examiner*—Prabodh Dharia
(74) *Attorney, Agent, or Firm*—Thomas, Kayden, Horstemeyer & Risley, LLP

(57) ABSTRACT

A document display device, comprising a memory arranged to store a document in the form of a sequence of pages; a display arranged to provide a user view of pages from the sequence; at least one user input device; a processor responsive to the at least one user input device to change the user view of the sequence of pages wherein the processor is arranged to allow reference markers to be associated with a page by a predetermined first input to the input device and further arranged such that a page associated with the reference marker can be at least partially displayed by a further predetermined input to the input device. Such an arrangement allows one or more pages to marked as a block of pages, and the device allows a user to refer back to the pages at either end of the block.

26 Claims, 13 Drawing Sheets

U.S. PATENT DOCUMENTS

| | | | |
|---|---|---|---|
| 2001/0042078 A1* | 11/2001 | Anwar | 707/500 |
| 2002/0080180 A1* | 6/2002 | Mander et al. | 345/769 |
| 2002/0140717 A1* | 10/2002 | Ho | 345/701 |
| 2002/0184189 A1* | 12/2002 | Hay et al. | 707/1 |
| 2003/0030673 A1* | 2/2003 | Ho | 345/779 |
| 2004/0017583 A1* | 1/2004 | Kageyama et al. | 358/1.15 |
| 2005/0088413 A1* | 4/2005 | Brewer et al. | 345/163 |

FOREIGN PATENT DOCUMENTS

| | | |
|---|---|---|
| WO | WO97/22104 | 6/1997 |

* cited by examiner

DOCUMENT VIEWING DEVICE

BACKGROUND OF THE INVENTION

1. Field of the Invention

The present invention relates to a document-viewing device and to a method of facilitating the retrieval of information.

2. Description of Prior Art

It is becoming increasingly common to store documents electronically. Such documents can comprise the traditional aspects of text and pictures, but it is increasingly possible to embed portions of sound or video clip within such documents. Such electronically stored documents can be viewed by a variety of different devices including personal computers, PDA's, etc.

Publishing has developed over a number of centuries, and arrived at various methods of grouping conventional sheets of paper as a convenient way of presenting information. It is known to produce electronic representations of such groupings that try to provide the convenience and familiarity of the groupings. It is known, for example, to provide views of documents that appear to be in the form of opened books or ringbinders, with two pages visible joined at a central spine.

To achieve an electronic representation of a document that more closely approximates a user's experience of a paper document, it is known to provide animation of the "turning" of a page in response to a user request to change pages.

Some documents published electronically, for example, those published on the World Wide Web, loose the convenience of the page based nature of paper publications, and can present the user with a block of text through which it is hard to navigate.

An example of a device that addresses these problems is shown in the co-pending U.S. patent application U.S. Ser. No. 09/715 845 filed by the applicant of this application on the Nov. 15, 2000.

Various methods of marking a reader location within a paper based document are well known. In addition to the traditional book mark, readers can insert fingers, or sticky labels, etc. between sheets to temporarily mark his/her position. Prior solutions for marking electronic documents include offering a user the ability to create a "bookmark", wherein the user is typically offered a facility to mark a page, and for later returning to this marked page. Typically a number of pages can be marked, and the user is able to remove marks when they are no longer needed. Marking a page, un-marking a page, and returning to a marked page, are accomplished through a user interface offered by the electronic device. The user interface may involve pressing buttons on the electronic device, or tapping a stylus on a portion of a display. Such solutions rely on a knowledge of the user interface, which may be forgotten, and is not as intuitive as may be desired.

It is an aim of the present invention to provide a device and method that address the problem of the prior art and try to overcome at least some of the previously discussed problems.

SUMMARY OF THE INVENTION

According to a first aspect of the invention there is provided a document display device, comprising a memory arranged to store a document in the form of a sequence of pages; a display arranged to provide a user view of pages from the sequence; at least one user input device; a processor responsive to the at least one user input device to change the user view of the sequence of pages wherein said processor is arranged to allow reference markers to be associated with a page by a predetermined input to the input device and further arranged such that said page associated with said reference marker can be at least partially displayed by a further predetermined input to the input device.

An advantage of such a device is that it provides a device that can provide a more intuitive display of information than prior art document display devices: a user may be able to view pages of the displayed document more conveniently, and naturally than before. Such an arrangement may allow a user to locate information more rapidly than in prior art document display devices.

Preferably, the display is arranged to display a substantial portion of two pages of the document at any one time. Such an arrangement is convenient because is provides a natural display of information.

In the preferred embodiment the device comprises at least two input devices. Although possible to provide a single input device that would allow inputs to be made to the processor in relation to both pages displayed by the device, it is more convenient to provide a separate input device for each page.

In some embodiments there may be provided a more than two input devices. For example there may be provided 3,4,5,6,7,8,9,10,11,12, or more input devices.

Conveniently, the pages may be arranged to have a front and a back face. Such an arrangement is convenient because it resembles the pages of a paper based version, which is convenient for a user to view.

The processor may be arranged to provide one or more intermediate views of the sequence of pages between successive views in which only the front or back face of a given page is visible in the user view. The intermediate views may be arranged to present part of both the front face and the back face of at least one page to a user. Such an arrangement allows a user to partially view both faces of the page and may therefore allow information to be located more rapidly than in prior art devices.

Conveniently, when a reference marker is introduced by a user the processor is arranged to cause the display to display an indicator that the reference marker has been introduced. The indicator may be a tab on a page, a portion of the screen that is activated, an indicator associated with an input device that is activated, or the like.

The input device may be arranged to provide co-ordinates associated with a user input. The co-ordinates may be generated by a user presence within a determined space. Such a device is advantageous because it provides the processor with co-ordinate information that may be used to control how the user view of the sequence is changed.

In the preferred embodiment, the input device is a digitiser track pad, which are readily available and convenient for such purposes.

Alternatively, or additionally, the input device may comprise a joystick, preferably an analogue joystick. Such an arrangement could also be used to provide the necessary user input to the processor and the processor arranged to generate co-ordinates that were associated with a user activating the joystick.

The processor may be arranged to introduce a reference marker when a first input having substantially no change of co-ordinates with respect to time is made to said at least one input device. Subsequently the page on which a reference marker has been placed (a referenced page) may be covered by other pages such that it can no longer be viewed.

The processor may be arranged to require that the first input has to be maintained for greater than a predetermined length of time before the processor is arranged to cause the display to display an indicator that the reference marker has been introduced. Such an arrangement is convenient because is prevents such markers from being created by accidental inputs to the input device.

The delay may be on the order of roughly any one of the following times: 50 ms, 100 ms, 150 ms, 200 ms.

Should a referenced page be covered by another page the processor may be arranged to cause the display to display at least a portion of that page if a second user input is detected on the at least one input device. Preferably the processor is arranged to accept a second input only if it comprises a rate of change of co-ordinates with respect to time. If the change of co-ordinates of the second input exceeds a predetermined threshold the processor may be arranged to cause the display to display substantially the entire referenced page.

The processor may be arranged such that if movement of the second user presence within the determined space is detected but does not exceed the predetermined threshold and is removed, the display is caused to revert to displaying the pages that were covering the referenced page.

Preferably, the user view comprises two page faces joined by a central spine.

According to a second aspect of the invention there is provided a method of facilitating the retrieval of information comprising providing a user with a device comprising a display showing a view of at least one page from a sequence of pages, allowing a user to introduce a reference marker onto said at least one displayed page by making a predetermined input to the device, and further arranging so that the page on which the reference marker has been placed can be at least partially displayed when a user makes a further predetermined input to the device.

Such a method is advantageous because it allows the user to readily refer to the page on which the reference marker has been placed at any later time. Such a method may make it easier to compare an earlier page with a subsequent page by simple inputs to the device.

The method may comprise providing the device with an input device that determines the co-ordinates associated with a user presence.

A user may introduce a reference marker by way of a first user presence on the input device, which is preferably by way of introducing a stationary input (i.e. an input having substantially zero rate of change of the co-ordinates with respect to time) to the input device.

Conveniently, the method may comprise using the co-ordinates provided by a second user input to the input device to determine whether a portion of the page on which a reference marker has been placed should be displayed.

A threshold may be applied to the co-ordinates provided by the second user input to the input device, such that if the threshold is exceeded substantially the entire page on which the reference marker has been placed is displayed. Such a method allows a user to view only a portion of the page on which a marker has been placed before committing themselves to seeing the whole of the page.

Preferably, if the second user presence is removed before the threshold is exceeded then the display reverts to the display that existed before a portion of the page on which a marker had been placed was displayed.

The method may provide more than one input device, and although the first and second user input may be applied to the same input device it may be convenient if they are applied to distinct input devices.

According to a third aspect of the invention there is provided a computer readable medium having contained therein instructions for causing a processor to execute the method of the second aspect of the invention.

Such a computer readable medium may comprise a floppy disc, a CD-ROM, a DVD ROM/RAM, a ZIP™ disc, a transmitted signal, an internet download, or any other form of computer readable medium.

BRIEF DESCRIPTION OF THE DRAWINGS

There now follows by way of example only a detailed description of aspects of the invention with reference to the accompanying drawings of which.

DETAILED DESCRIPTION OF THE DRAWINGS

The preferred embodiments shown relate to a device particularly adapted for document display. However, the invention is not limited in its application to such a device. The skilled person will appreciate that conventional computer systems (such as personal computers, personal digital assistants and palmtop computers) can be adapted for use according to the invention, typically with the addition of existing conventional peripherals (such as a digitiser touchpad for user input).

Figure 1:
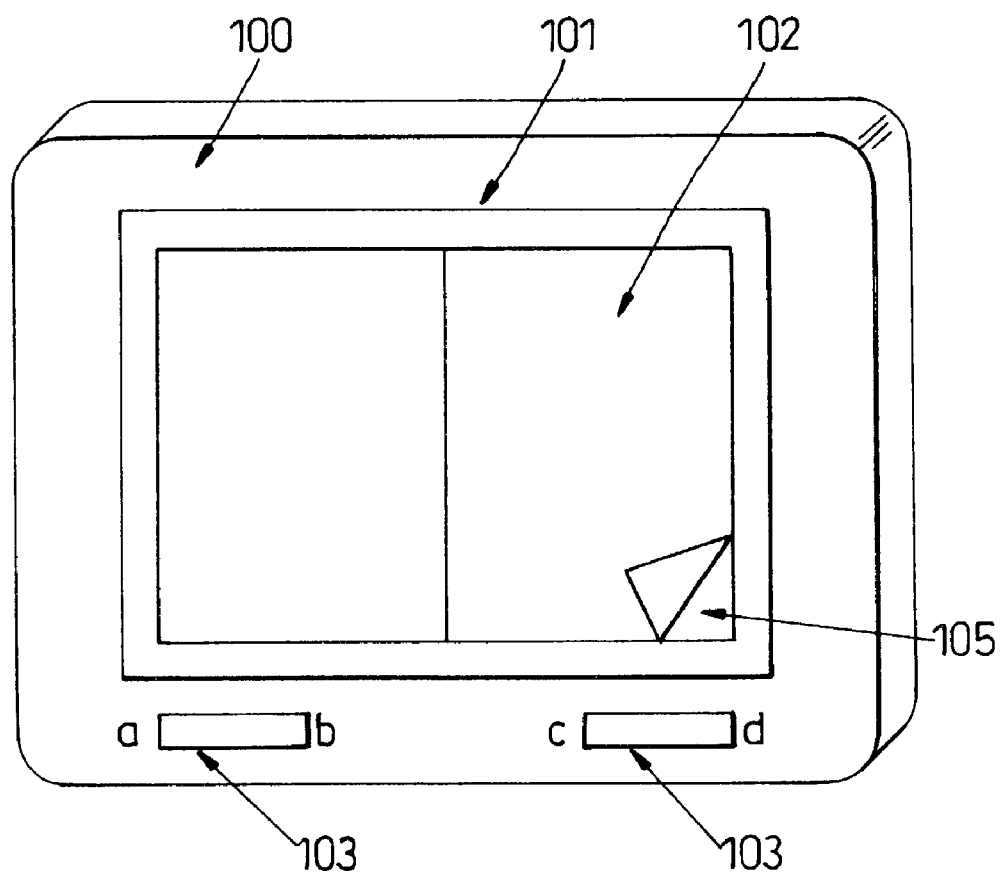
FIG. 1 shows an electronic viewing appliance adapted for use with embodiments of the present invention.

FIG. 1 shows the physical appearance of an electronic viewing device 100 particularly adapted for use of embodiments of the present invention. The device has a display screen 101 on its front surface, and is adapted to display images of book pages 102 (in this case, in an arrangement resembling an opened book, with two pages visible to either side of a central "spine"). Such a device can be considered an "electronic book" viewer. Input devices 103 are available for the user to turn the pages of the electronic book, several of which are provided around the perimeter of the device. In the arrangement shown in FIG. 1, for example, the input device below the left hand page may be used to progress backwards through the electronic book and the input device below the right hand page may be used to advance through the book. These input devices 103 have the extra functionality described hereinafter.

Figure 2:
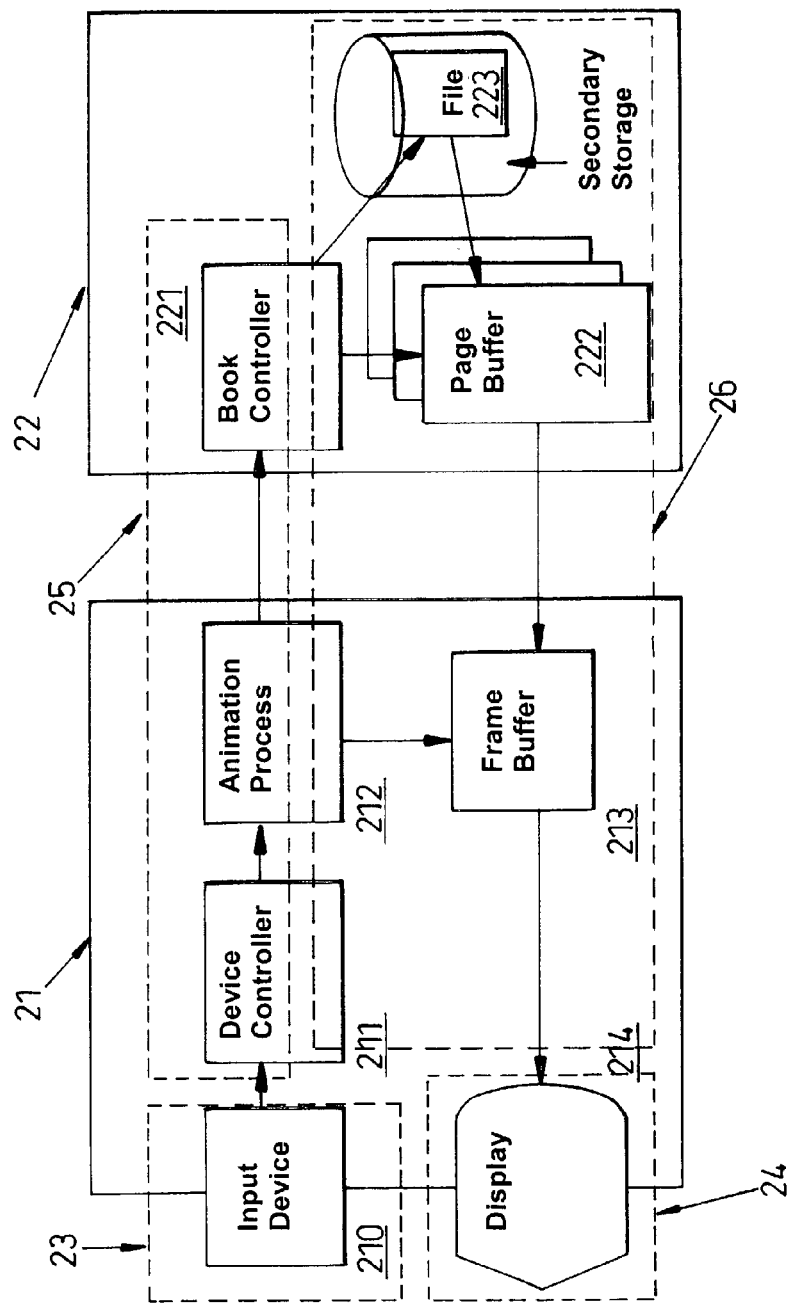
FIG. 2 shows a system diagram of the electronic viewing appliance of FIG. 1.

FIG. 2 is a system diagram of the electronic viewing appliance of FIG. 1 and shows key elements of the system. The system can be considered as divided into book reader 21 and electronic book 22. Electronic book 22 is separable in this way, as it effectively acts as a discrete coherent process interacting with the elements of the book reader 21 to provide digital content for display in response to user input. An alternative way to consider the system is in terms of resource type—shown in dashed lines—resources can be divided into user input devices 23, displays 24, processors (or functions carried out by one or more common processors) 25 and memories (or storage carried out by one or more common memories) 26. Certain functional elements require more than one kind of resource—a control function typically requires both processor and memory resources.

The book reader 21 comprises a user input device 210. The requirements for the user input device 210 will be described in greater detail below, but a particularly suitable form of user input device is a touchpad digitiser, providing as an output presence or absence of a touching element (user finger or stylus) and co-ordinates of the touch event. User input from user input device 210 is received by device controller 211, which has the central role in operating the book reader. Device controller 211 receives inputs from the input device (for example, presence or absence of user touch and co-ordinates of a touch event), advantageously by regular polling of the user input device (a suitable process is described further below). The device controller interprets the user input and provides values to an animator process 212 (again, a suitable process is described further below)—the animator process determines the nature of the output to be displayed (in terms of the parts of each page to be displayed) but not the actual content to be displayed. This information is passed to the electronic book process 22, and also to a frame buffer 213. The frame buffer 213 receives content information from the electronic book process 22, and then passes this content information to display 214 for display in a conventional manner.

Electronic book process 22 receives from the animator process 212 an indication of what content is required, either in an absolute manner (which would require certain parameters of the specific electronic book to have been passed, for example, to the device controller 211 at an earlier stage) or relative to content currently provided to the book reader 21 by the electronic book process. This request is interpreted by the electronic book process into a request for specific pages (or parts of specific pages) of content from the electronic document 223. In the particular arrangement shown in FIG. 2, the electronic document is a file held in secondary storage 224, rather than in a main memory of the book reader 21, as it is generally not necessary for the whole of a large electronic document to be held in fast memory directly accessible by the book reader processor. For example, electronic document 223 can be stored in a file system held on any non-volatile medium in communication with the book reader 21, such as a disk drive, flash memory or memory stick—alternatively, the electronic document can be loaded from a server connected to the book reader 21 by a network.

To achieve rapid book operation, a page buffer 222 is used, in this arrangement, to hold a limited number of pages of the document for access by the book reader 21.

The page buffer 222 is fast memory directly accessible to the processor or processors of the book reader 21. Advantageously, pages will have been pre-fetched from the secondary storage 224 to the page buffer 222 such that the request from the animator process 212 can be met from the page buffer 222 directly once the request is interpreted by the book controller 221 and passed to the page buffer 222—the request is also used to arrange pre-fetching of further content from main memory in accordance with likely further requirements (for example, if the user is advancing through the book an early page before the current viewing point may be replaced by a later page which would be reached by further advancing through the book). The content required by the book reader 21 is thus provided from the page buffer 222 under control of the book controller 221.

Figure 3:
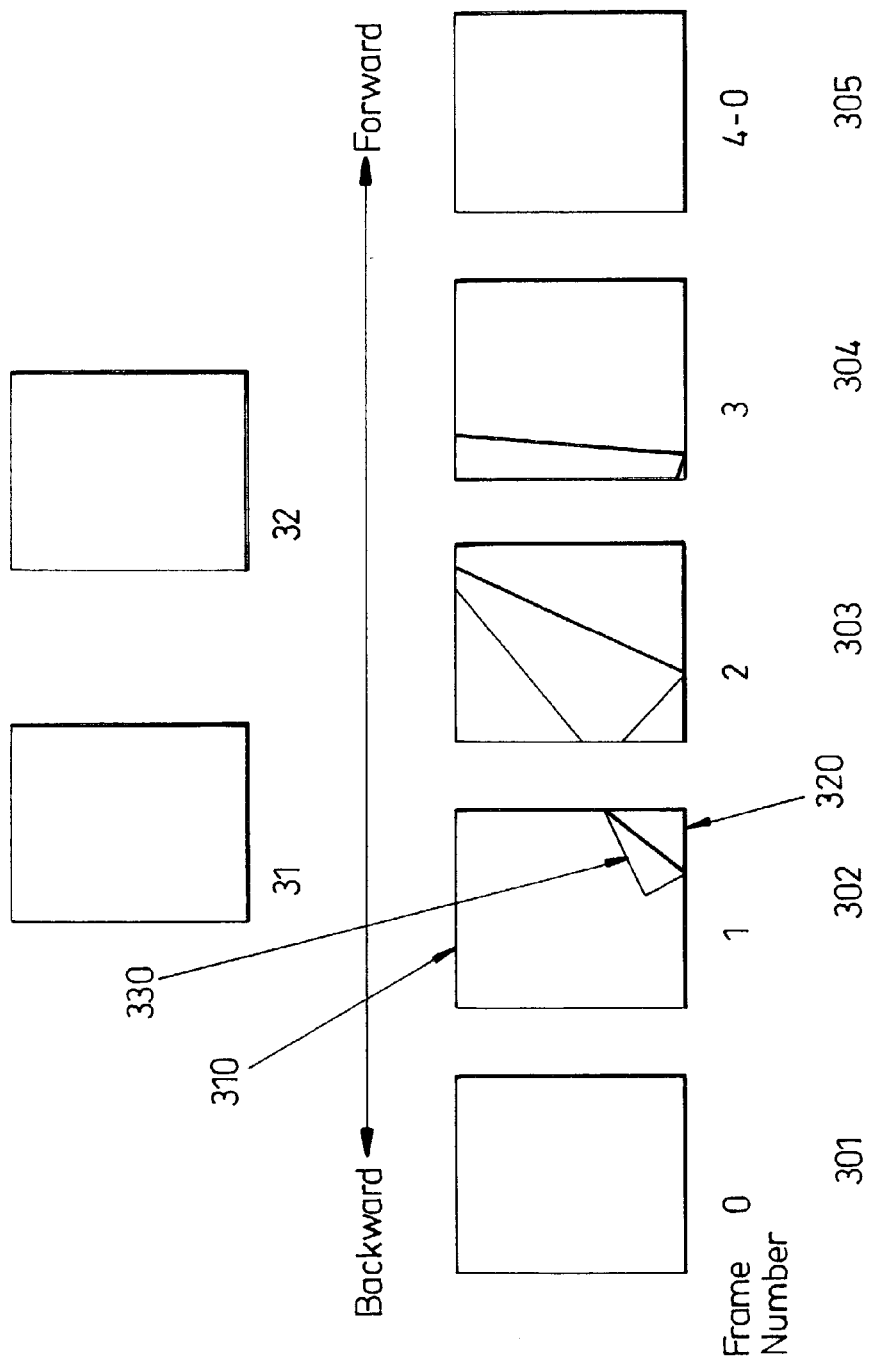
FIG. 3 illustrates animation of page turning according to one embodiment of the invention.

FIG. 3 shows successively viewed frames according to a first embodiment of the invention. The arrangement shown in FIG. 3 differs from that shown in FIG. 1 in that only a single full page is viewed, rather than two full pages separated by a central spine—the FIG. 3 "one page view" arrangement resembles that of a reporter's notebook, with a "spine" at one edge of the page, pages being turned by "rotation" around the spine. Information content is thus only provided on one side of a page, as in a normal view the other side of the page will not be revealed.

FIG. 3 shows all the views provided by the animation process 212 between the full view of a first page 31 and the full view of a second page 32. In a conventional system, a page turning operation would cause the view of the first page 31 to be simply replaced by the full view of the second page 32. In an arrangement according to an embodiment of the present invention, there are three intermediate views between full view of the first page 31 (view 301) and the full view of the second page 32 (view 305). The first of these views is a view 302 with the corner of the first page 31 turned over. There are three separate content regions of this view: region 310 in which content of the relevant part of page 31 is displayed; region 320 in which content of the relevant part of page 32 is displayed; and region 330 in which a "page back" of page 31 is displayed—as this "page back" is not displayed in a normal view, it generally will not contain any information content. The next view 303 shows page 31 further "turned"—region 310 is now much smaller, and region 320 much larger. The next view 304 shows essentially no region 310 and almost the whole of region 320. The next view 305 is the full view of page 32. Essentially, this can be considered as a four view sequence, with the view 4 of a sequence being equivalent to view 0 of the next sequence. The number of views in the sequence can be a variable OPT—in order to provide a particularly natural appearance to the page turn, OPT should be set much larger (setting OPT to 256 is sufficient to achieve a highly natural appearance to page turning). The value chosen for OPT may be a compromise between processor performance for the system and the amount of content to be rendered in order to achieve as naturalistic an appearance of page turning as possible without processor performance causing a perceptible delay—which would detract from the utility of the system as well as affecting the user's perception of the naturalistic nature of the page turning. Clearly, reverse page turning (from second page 32 to first page 31) simply follows the sequence in reverse, from view 305 through views 304, 303, 302 in succession to view 301.

Figure 10:
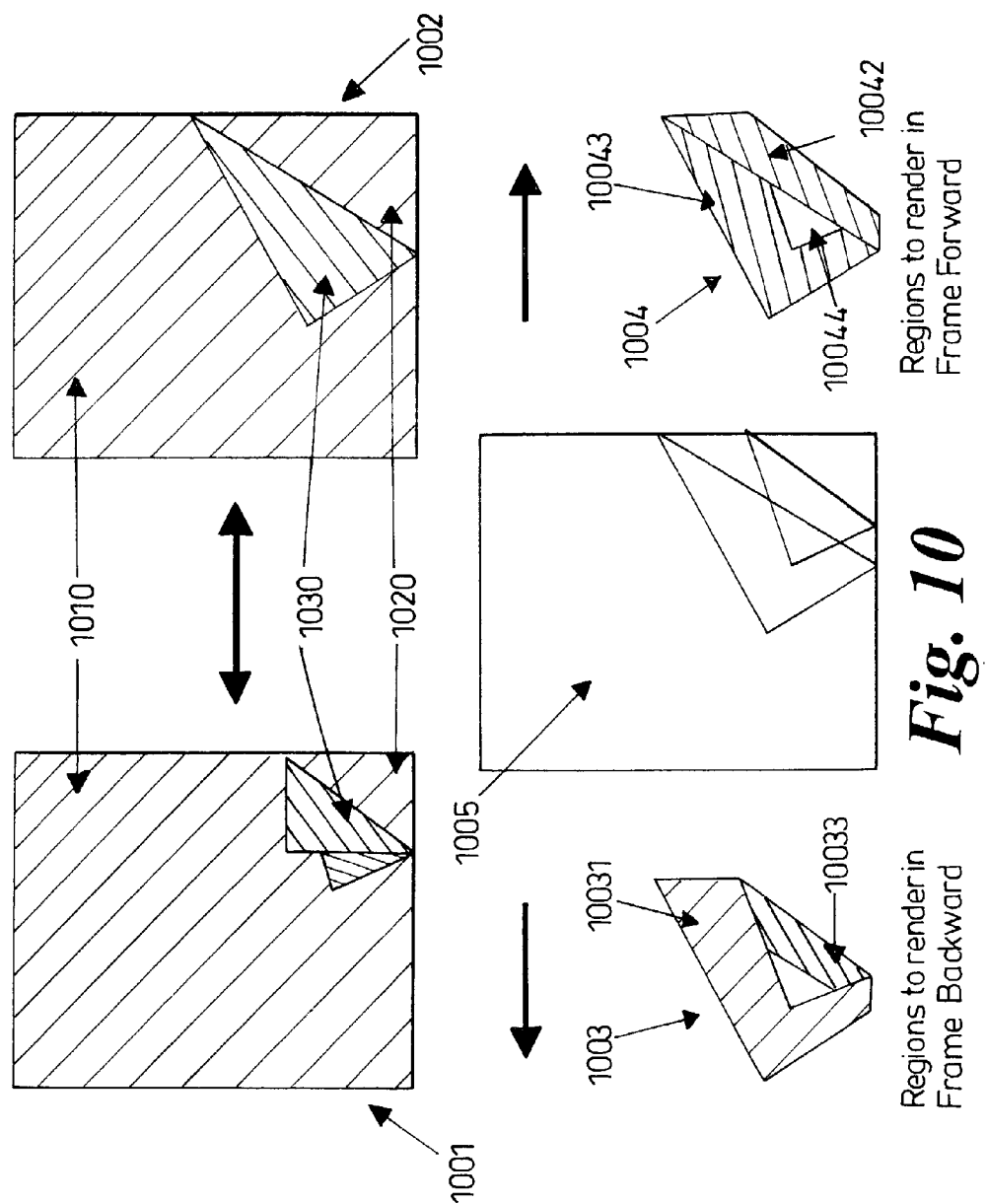
FIG. 10 shows differences in rendering for incremental page turns for the arrangement shown in FIG. 3.

FIG. 10 illustrates the differences in rendering between two adjacent views in the system of FIG. 3 (as will be seen from the views in FIG. 10, the FIG. 10 arrangement has a value of OPT higher than that used for FIG. 3). A first adjacent view 1001 and a second adjacent view 1002 are shown: each view contains an area of first page 1010, an area of second page 1020, and an area of page back 1030. As can be seen from superposition 1005 of the two adjacent views, only a part of the screen area needs to be replaced between the two adjacent views—it is not necessary to calculate what needs to be displayed on the remainder of the screen either in moving from view 1001 to view 1002 or vice versa. The rendering scheme for forward motion (from view 1001 to view 1002) is shown in segment 1004: first segment part 10042 now needs to be rendered as the appropriate part of second page 1020 ("revealed" by the turning page), and second segment part 10043 now needs to be rendered as page back. Region 10044 is not part of segment 1004—it is page back in both views (segment 1004 is, topologically, an annulus). The rendering scheme for reverse motion (from view 1002 to view 1001) is shown in segment 1003, which is of the same dimensions as segment 1004: first segment part 10031 needs to be rendered as the appropriate part of first page 1010, and second segment part 10033 needs to be rendered as page back.

Figure 4:
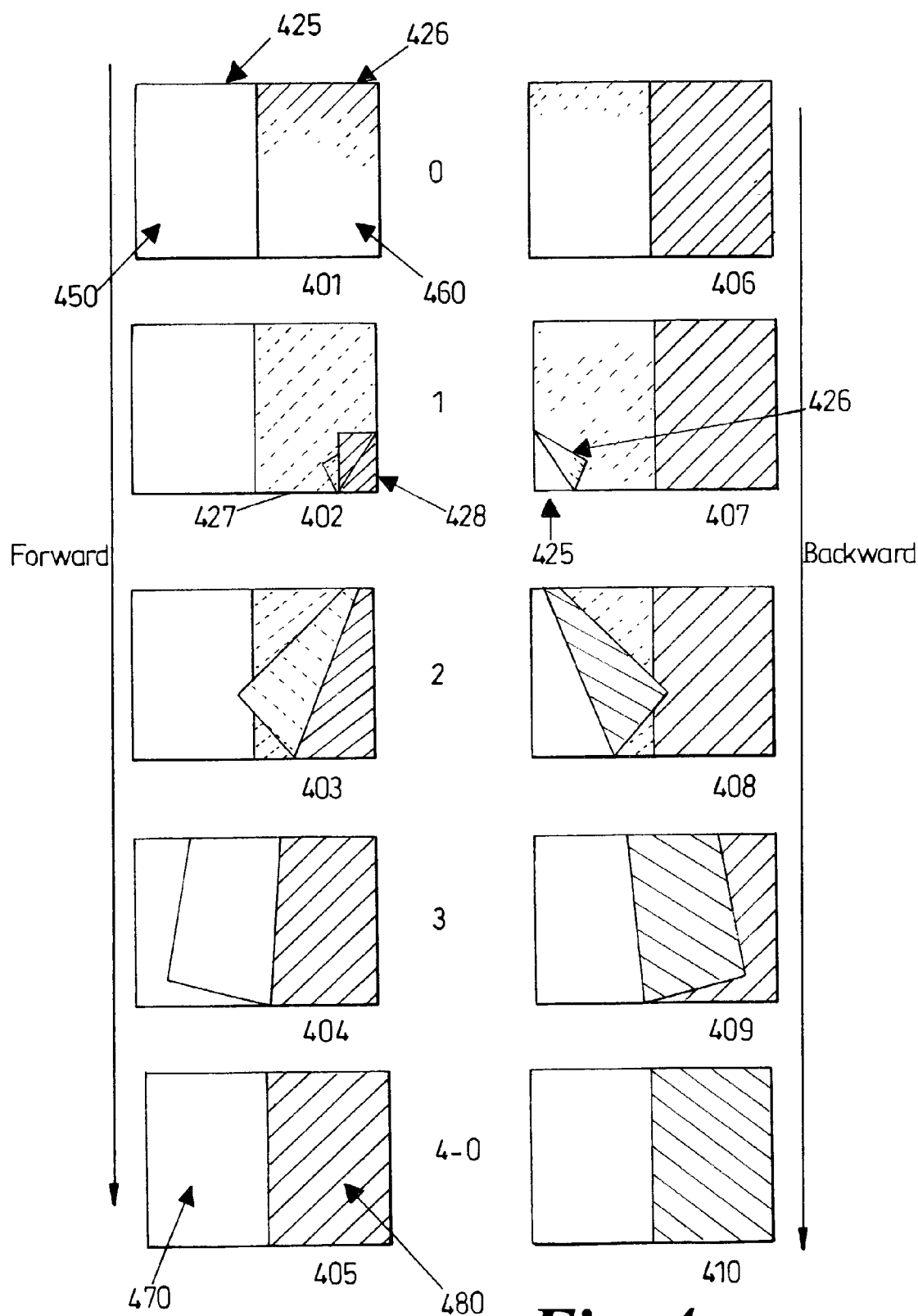
FIG. 4 illustrates animation of page turning according to a further embodiment of the invention.

FIG. 4 shows successively viewed frames according to a second embodiment of the invention. The frames of FIG. 4 are appropriate to the arrangement shown in FIG. 1, in which a full page view shows two pages separated by a central spine.

The arrangement shown follows the principles of FIG. 3 and has an OPT value of 4, but the arrangement is more complex because of the two page view. One complexity is that the symmetry between forward and reverse page turning is broken—the right hand page is turned to advance, and the left hand page turned to go backwards—in order to achieve naturalistic turning simulating the lifting of a page from its corner for rotation around the spine. The second complexity is that for a document of this type, it will generally be desirable for information to be presented on both sides of a page -in turning of a page, there are thus four content bearing sides of interest, parts of all of which may be visible at any one time.

The initial view is view 401, in which all of a first side 450 and of a second side 460 are seen. Second side 460 is one face of the page that is to be turned—the other face is third side 470, which also contains content. In first transition view 402, the page has begun to turn, revealing equal areas of a third side region 427 and a fourth side region 428 in which respective parts of the third side 470 and a fourth side 480 (previously hidden behind the turning page) are revealed—in consequence, a region of second side 460 now "beneath" the turning page is obscured. In second transition view 403, the page has further "turned"—the third side region 427 and the fourth side region 428 are both larger, and not only has a large part of second side 460 been obscured but also a small part of first side 450. In third transition view 404, third side region 427 and fourth side region 428 show much the greater part of the content of third side 470 and fourth side 480 respectively, and effectively all of second side 460 and most of first side 450 is concealed. In the fourth transition view 405 the page has been fully turned, and third side 470 and fourth side 480 are fully visible.

View 406 is the same as view 405, but is here shown as the initial view in the process of turning back from third and fourth sides 470, 480 to reveal first and second sides 450, 460. First reverse transition view 407 shows the turning page partly turned to reveal a region 425 of the first side 450 previously concealed by the third side 470, together with a region 426 of the second side 460 (the previously concealed part of the turning page)—a region of third side 470 is concealed by regions 425 and 426.

Second transition view 408 and third transition view 409 show progressive exposure of first side 450 and second side 460 and concealment of third side 470 and then fourth side 480. Fourth transition view 410 is the same as view 401, with first side 450 and second side 460 fully visible.

Figure 11:
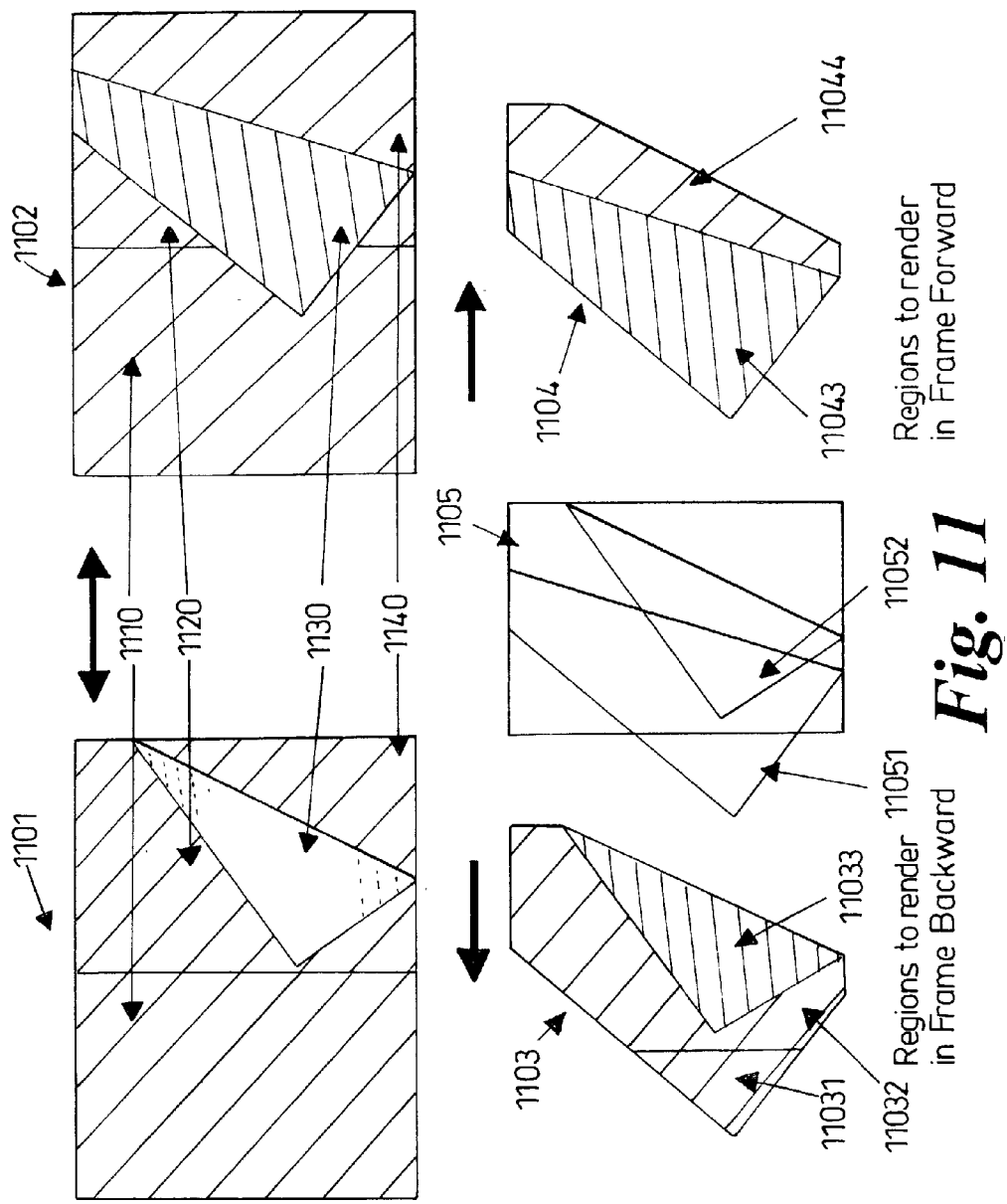
FIG. 11 shows differences in rendering for incremental page turns for the arrangement shown in FIG. 4.

FIG. 11 shows the rendering between two successive views in an arrangement of the kind shown in FIG. 4 (though with a higher value of OPT). The first view 1101 of the successive views has regions of the first side 1110, the second side (the first side of the turning page) 1120, the third side (the second side of the turning page) 1130 and the fourth side (previously hidden below the turning page) 1140 all visible, as does the second view 1102, in which more of the third and fourth sides are visible but more of the first and second sides are concealed. As can be seen by the superposition 1105 of first and second views 1101, 1102, in moving from first to second view an area 1104 needs to be newly rendered—the remainder of the view is unchanged. This area 1104 has a first segment 11043 consisting of part of the third side and a second segment 11044 consisting of part of the fourth side. Unlike the FIG. 10 arrangement, the segment does not have an "annular" form. This is because the third side has information content, unlike the "page back" in the FIG. 10 arrangement—the region to be re-rendered contains a region which was used in view 1101 to display third side content, but the position of the third side 1130 has "moved" relative to the user view—what will be the bottom left hand corner of the third side has moved from position 11051 to 11052 (considering superposition 1105) and the information content of the third side must be displayed accordingly. The area 1103 to be re-rendered in the reverse transition is also shown—again, the third side segment 11033 consists of the whole of the third side visible in view 1101, whereas the first side segment 11031 and the second side segment 11032 merely show the parts of the first and second sides concealed by the turning page in view 1102 but not in view 1101.

It should be noted that the "reverse transition" shown in FIG. 11 is not the normal operation of progressing backwards through the document (which would involve turning the left hand page, and not the right hand page). The reverse transition of FIG. 11 may instead be shown when a page is not fully turned, but instead partially turned and then turned back. This possibility will be further discussed below.

Figure 5:
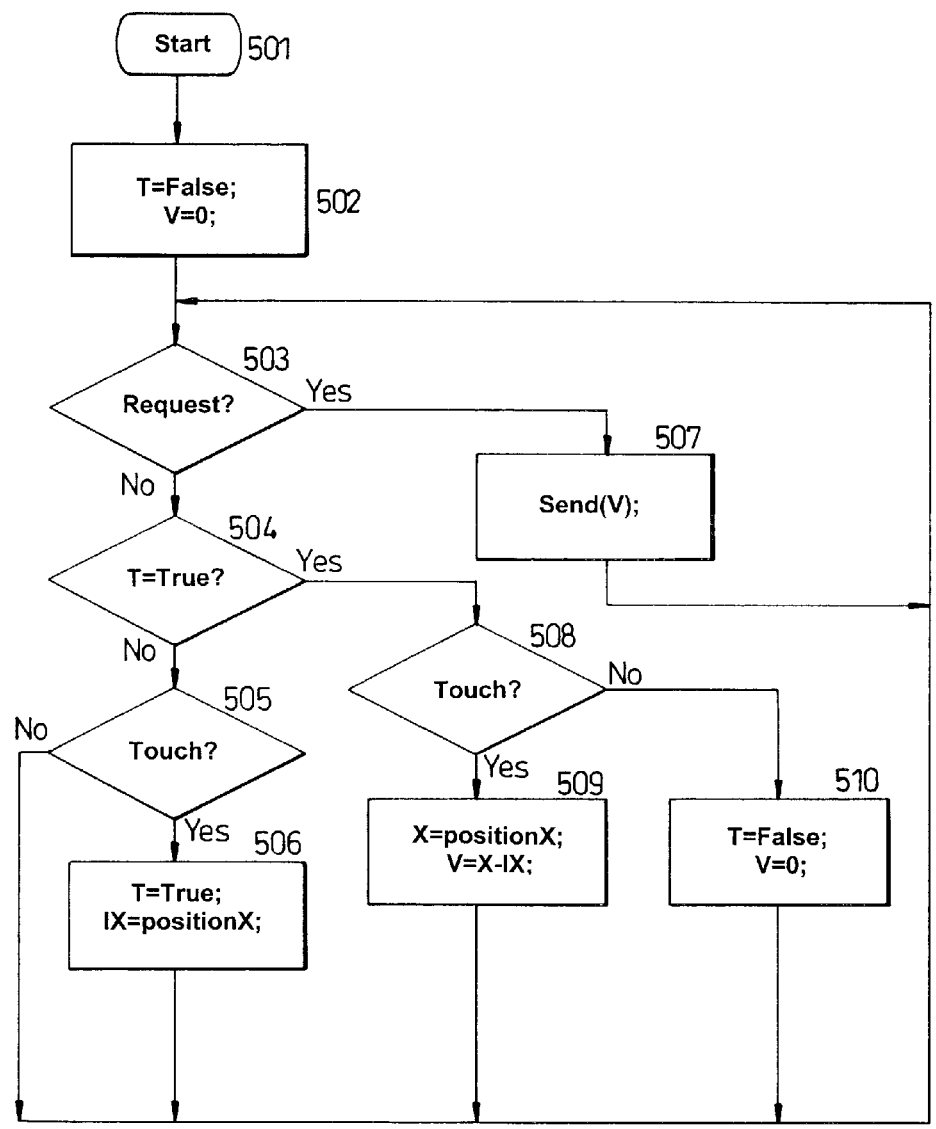
FIG. 5 shows a flow chart illustrating operation of a user input device according to an embodiment of the invention.

The process for obtaining user input and providing it to the animation process will now be described with reference to FIG. 5. In this particular version of the process, the user input device is a digitiser touchpad, and only one coordinate dimension (most logically the x-axis) is considered—thus the user may achieve (for example) page turning in the forwards direction by passing his finger over the touchpad from right to left (replicating the motion adopted in turning over a physical page), and may achieve page turning in the reverse direction by passing his finger over the touchpad from left to right. Other forms of input device are equally possible, and the skilled person will understand how the process described with reference to FIG. 5 could be modified to achieve equivalent effect.

At the start 501 of the process, Boolean variable T is initialised with the value False and numerical variable V is initialised with the value 0. Variable T indicates the presence or absence of user input, and variable V a relative coordinate position of the user input. The process then moves into an infinite loop until terminated. The first step in the loop is step 503, where the system checks to see whether there has been a request for data from the animation process. If yes, the present value of V is returned for interpretation and provision to the animation process in step 507, and the process returns to the top of the loop. If there has been no request, the current value of T is checked in step 504. If the current value is not True, the user input device is polled to see if there is any user input. If no, the process returns to the top of the loop, but if yes, in step 506 T is set to True and a further variable IX is set to the current user input coordinate (Position X)—this is the initial X value—and the process reverts to the start of the loop. If the current value of T is found to be true in step 504, then in step 508 it is again checked whether there is any user input. If there is no longer user input, in step 510 T is set to False and V is set to 0, and the process returns to the top of the loop. If there is still user input, in step 509 a further variable X—current X value—is set to the current user input coordinate and V is set to the difference between current and initial X values (V=X−IX) and the process again returns to the top of the loop. Clearly, in this arrangement, the time between successive requests from the animation process is greater than the average time for traversing the loop (though alternative processes could clearly be devised if the alternative was considered to be desirable).

The values from the user input are used by the animation process 212 as follows—again, this preferred embodiment supposes that user input in one dimension only is used and that movement to the left is positive and relates to forward page turning and that movement to the right is negative and relates to backward page turning—though as will be appreciated by the skilled person, other types of user input value can be used according to similar principles to achieve results in accordance with the present invention.

A further variable TP is used to indicate the full range of input values that can be received from the input device—in this case, TP will represent the difference in X coordinate value between the left and right edges of the touchpad. Consequently, if the user rubs the touchpad from the left end to the right end, the value of V returned on reaching the right end is TP (rubbing from right to left end, the value of V at the left end would be−TP). As previously indicated, OPT is the number of frames used in turning one page (in FIGS. 3 and 4, OPT=4). A further variable, AT, is set as the number of frames that need to be turned for the page to be turned (if, for example, the user then removed their finger from the touchpad). If AT were reached, the page would continue to turn until completely turned, whereas if AT were not reached, the page would turn back to its pre-turning operation—it is in this "relaxing" back to the pre-turning position if AT is not reached that the "backward" rendering step in FIG. 4 would be employed, as to achieve a realistic impression of naturalistic page turning, the display would need to work back through each of the frames in the turning sequence until the full page view.

Clearly it is necessary that $0 < AT <= OPT$ for the system to function adequately, but the exact value of AT relative to OPT could be, for example, optimised by user preference. Likewise, for a practical system, it should also be the case that $ATV < TP$, where ATV is the distance along the touchpad corresponding to AT.

On a request for data by the animation process 212, the control process takes the current value of V and interprets the type of input. The input type (rather than the simple V value) is the key input required by the animator process 212. The different input types resulting from different input values are shown in Table 1 below:

TABLE 1

Input types for animation process

| Input Value | Input Type | Speed (for Tf and Tb) |
|---|---|---|
| TP > V > ATV | Tf (Turn Forward) | F(V − ATV) |
| ATV > = V > 0 | Pf (Proportional Forward) | |
| V = 0 | Z (Zero) | |
| 0 > V > = −ATV | Pb (Proportional Backward) | |
| −ATV > V > −TP | Tb (Turn Backward) | F(−ATV − V) |

If V is equal to zero, the input type is Z (for zero)—the page animation will generally be stopped at frame 0 of a page turning process. If V is between ATV and −ATV, it lies in the "proportional" range—this means that the frame displayed is controlled by the value V (for example, the number of the frame displayed could be Int(AT*V/ATV), in the forward or reverse turning sequence as appropriate). When Int(V) is greater than AT, the animation moves into "page turning" mode. In "page turning" mode, animation proceeds from frame to frame continuously, moving directly on to the next page once the current page is turned—the value of V now controls the speed of page turning.

Figure 6:
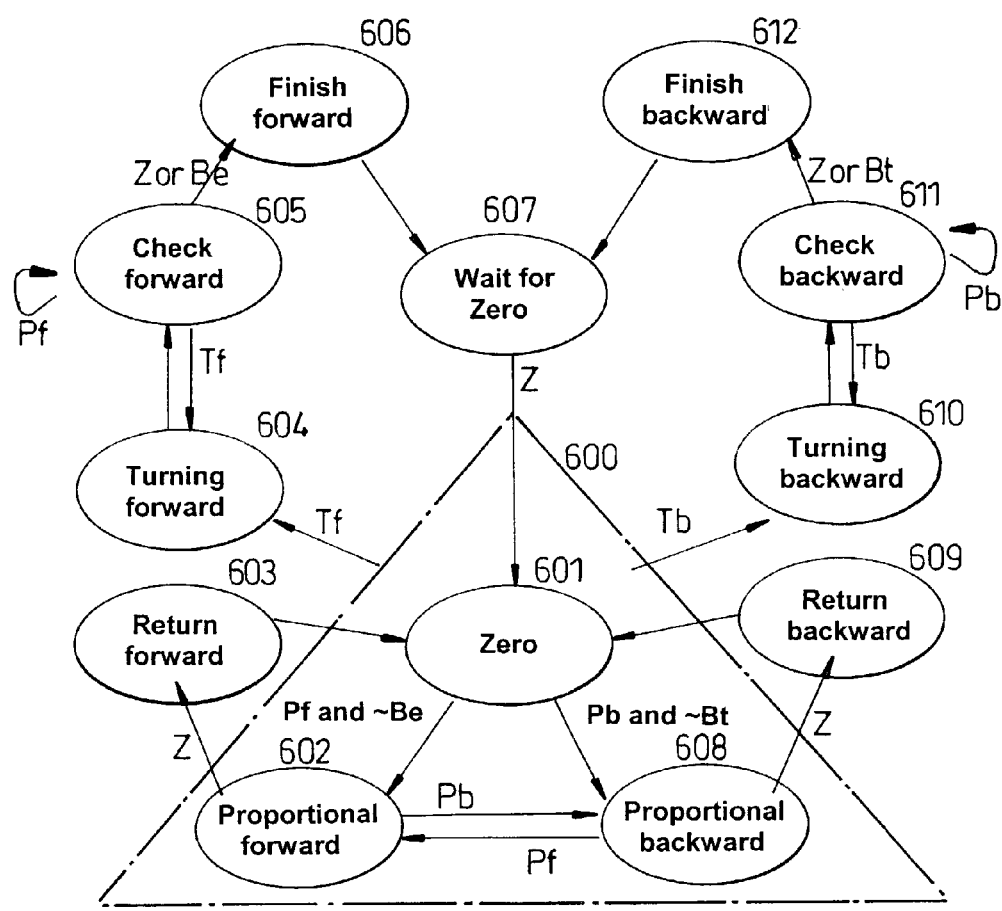
FIG. 6 shows a finite state machine describing animation of page turning according to an embodiment of the invention.

The finite state machine of the animation process 212 is shown in FIG. 6. Ellipses show different states, and symbols beside arrows show input values or page status. In addition to the input types described above, "Be" indicates the end of the book (last page is currently displayed) and "Bt" indicates the start of the book (first page is currently displayed), whereas "~" before any symbol indicates negation (for a Boolean variable, the "NOT" operator).

The program begins in the "Zero" state 601. The speed of sampling will be selected such that the next state will in practice be "Proportional Forward" 602 or "Proportional Backward" 608. The frame to be displayed will be proportional to V (as indicated above). If the user releases from the touchpad before V reaches ATV, the value V will return to zero directly. If this occurs, the appearance to the user will not be naturalistic if frame 0 immediately reappears—consequently the next state after "Proportional Forward" is not the "Zero" state 601 if the user releases directly, but the "Return Forward" state 603, in which the animation frames progress back at predetermined speed from the present frame value to the zero frame (and the "Zero" state 601). While the animation process is in the "Return Forward" state 603, user input is ignored.

When the input state goes beyond the proportional states (shown generally as 600) to Tf, "Turning Forward" state 604 is entered. The animation process 212 is now committed to turning at least one page, and the value V is used now not to determine the frame displayed directly, but instead to indicate the speed of page turning (so that if the threshold value is just exceeded, page turning is slow, but if it is vastly exceeded, page turning is fast). The frame speed is calculated from V (for example, as proportional to (V−ATV)), and the next frame to be shown at the calculated frame speed is displayed. After "Turning Forward" state 605, the animator process 212 is required to pass to "Check Forward" state 605, in which the value of input state is checked—if Pf, the input state is ignored (preventing an unnaturalistic reversion to proportional mode), but if Tf, the animator process reverts to "Turning Forward" state 605 to determine whether the speed of page turning has changed and to determine how many frames the display should advance. If the user has lifted his finger or the book has reached the end (states Z and Be—to avoid errors, states Pb and Tb could perhaps also be included, though it is unlikely that either could appear, though these states could also be included with Pt), the animator process moves instead to "Finish Forward" state 606. This brings the continuous turning process to a finish. The currently turning page continues turning (most logically at the present frame speed) until the frame number reaches OPF—which it will not be allowed to exceed—and the state transitions to "Wait for Zero" 607. In this state, all input values other than zero are ignored. When zero is detected, the state reverts to "Zero" state 601.

The operations for reverse page turning are essentially the same. "Proportional Backward" state 608 is succeeded by "Return Backward" state 609 to provide a phased return to the "Zero" state 601 if the turning threshold is not reached. If the turning threshold is reached from the proportional states 600 in the reverse direction, "Turning Backward" state 610 is reached, followed by "Check Backward" state 611 (which operates essentially as "Check Forward" state 605, with Pb the equivalent to Pf, Tb the equivalent to Tf, and Z and Bt the equivalents to Z and Be respectively. If turning is to end, "Finish Backward" state 612 is succeeded by the "Wait for Zero" state 607 as before.

To illustrate operation of the system described above, examples are shown with reference to FIGS. 7, 8 and 9. In each figure: part (a) shows the movement of a user finger on the touchpad, with thin arrows showing vertical movement (touch and release), and circle, triangle and square indicating touch, release and hold positions, with a thick arrow showing movement of the finger along the touchpad; part (b) shows the input value generated by device controller 211; part (c) shows frame number displayed; and part (d) shows page displayed (with time as horizontal axis for parts (b) to (d)).

EXAMPLE 1

Figure 7:
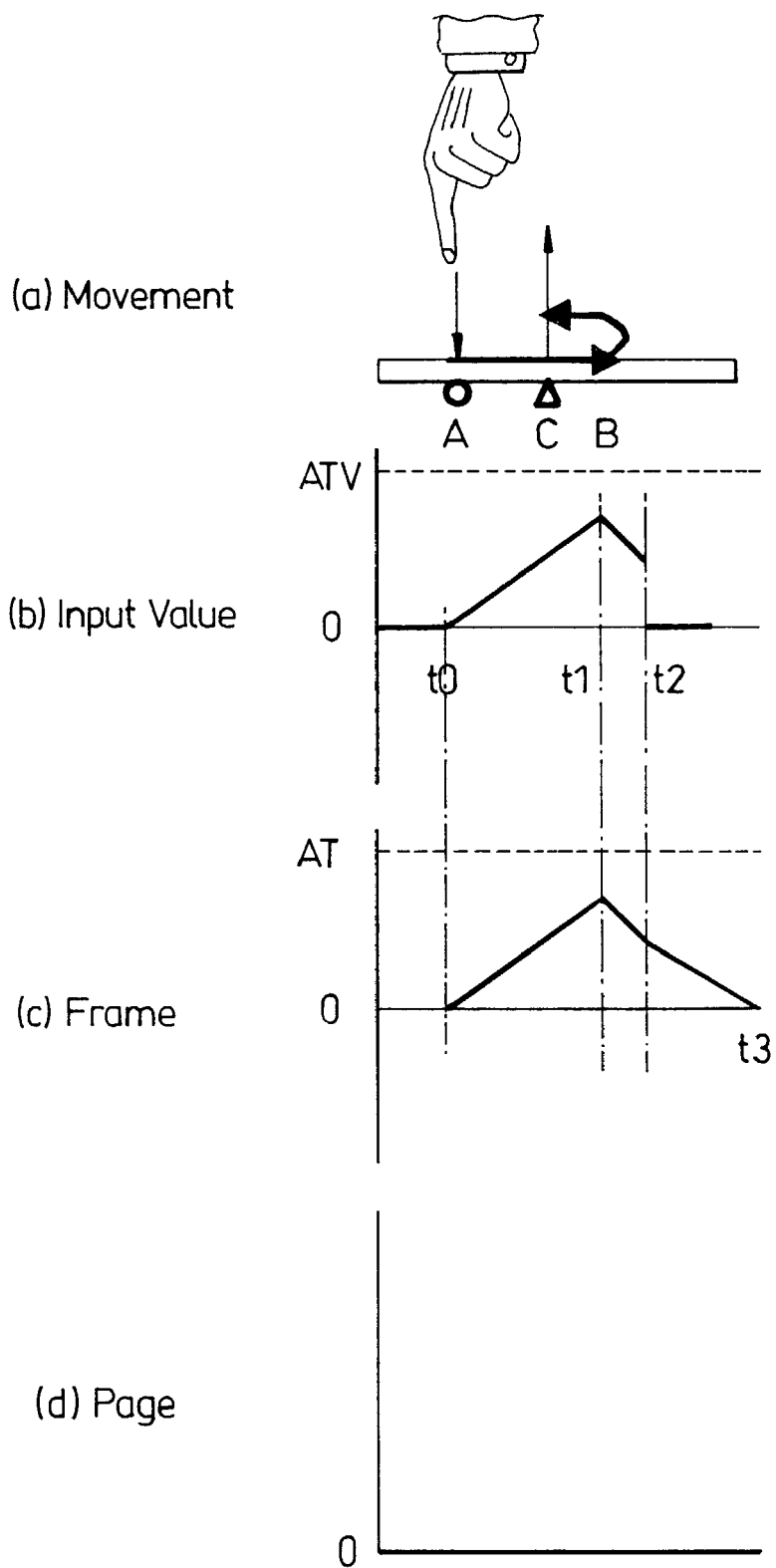
FIG. 7 illustrates a first example of operation of an embodiment of the invention for specific user input.

This is illustrated in FIG. 7. The user places his finger on the touchpad at point A, moves to B, back to C, and then releases the finger—this kind of motion may be made when the user is considering whether or not to turn the current page. The furthest distance traveled by the finger (AB) is less than ATV, so the page animation does not reach turning mode.

As can be seen from part (b), the input value V starts at zero, and increases (from t0 to t1) and then decreases (from t1 to t2) proportionally to V (distance of the user's finger from the initial contact point). When the finger is released at t2, the value of V returns to zero. The effect on the frame shown is shown in part (c): the frame advances with V until t1, then decreases until t2, and after t2 (the animation process having passed to the "Return Forward" state) returns to frame 0 at a predetermined rate. As can be seen from part (d), the effective page does not change throughout, as the page turning threshold is never reached.

EXAMPLE 2

Figure 8:
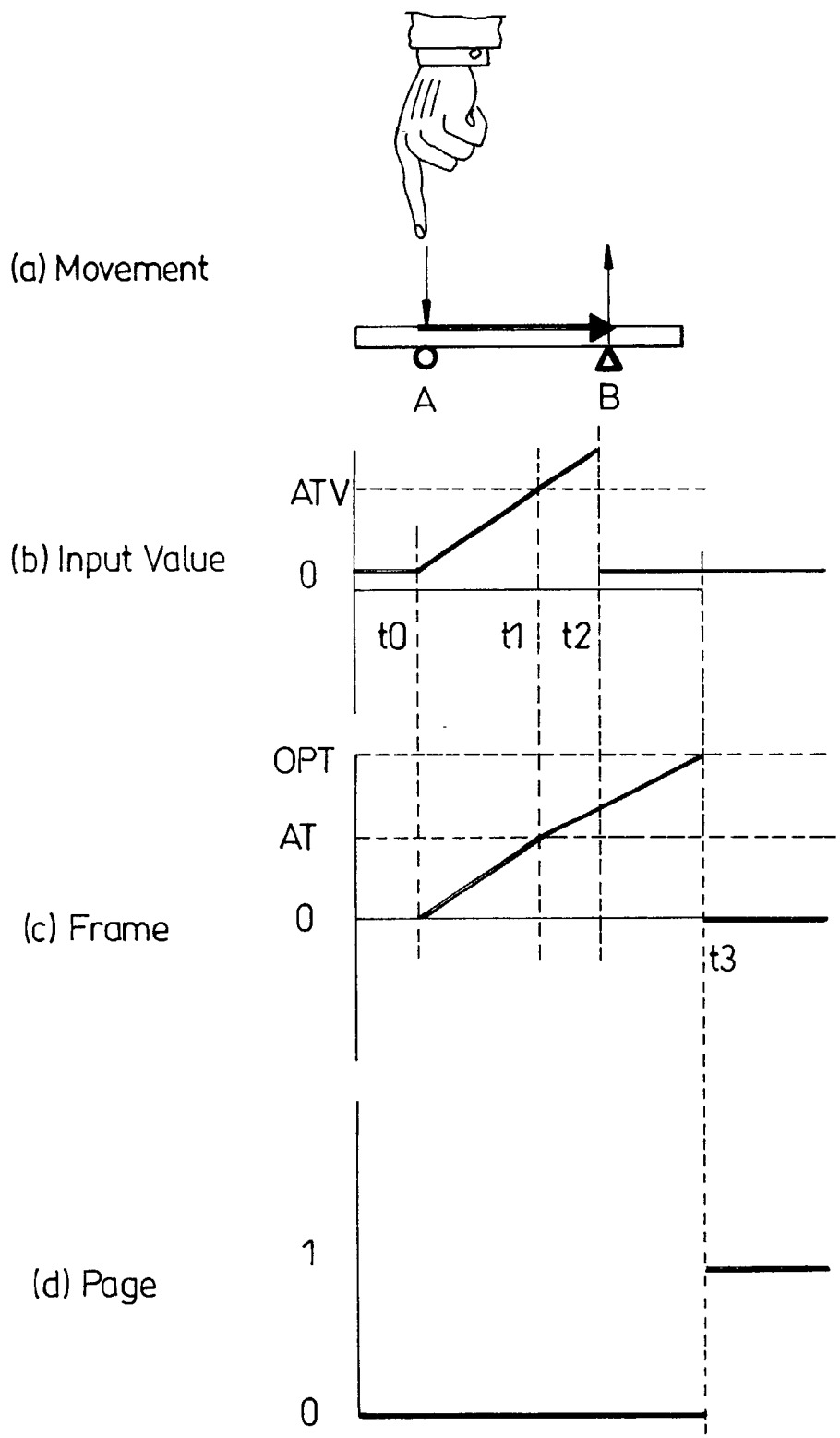
FIG. 8 illustrates a second example of operation of an embodiment of the invention for specific user input.

This is illustrated in FIG. 8. The user touches the touchpad at A, moves it to B, and releases it. This motion, of "rubbing" or "stroking" the touchpad, is analogous to a motion that may be made by a user in turning the page of a physical book. In this case, the distance AB is greater than ATV, and page turning mode is entered—here, a single page is turned.

As can be seen from part (b), as distance AB is longer than the page turning threshold distance ATV, the input value rises proportionally, exceeding ATV, falling to 0 when the user releases at point B. As can be seen from part (c), the frame shown is proportional to V until frame AT is reached at distance ATV and time t1. From this point it is inevitable that at least one page will be turned—"Turning Forward" state 604 has been entered. Frames thus continue at a rate determined by the value of V up until the user input returns to 0 at t2. At this point frame OPT has not yet been reached (the page has not turned) and the "Finish Forward" state 606 is entered—the page continues to turn at the same rate until the page is fully turned, at which point page turning stops, at t3, at the "Return To Zero" state 607 is entered, followed by a return to the "Zero" state 601 (as there is no user input, V=0). As part (d) indicates, at t3 the page is fully turned.

EXAMPLE 3

Figure 9:
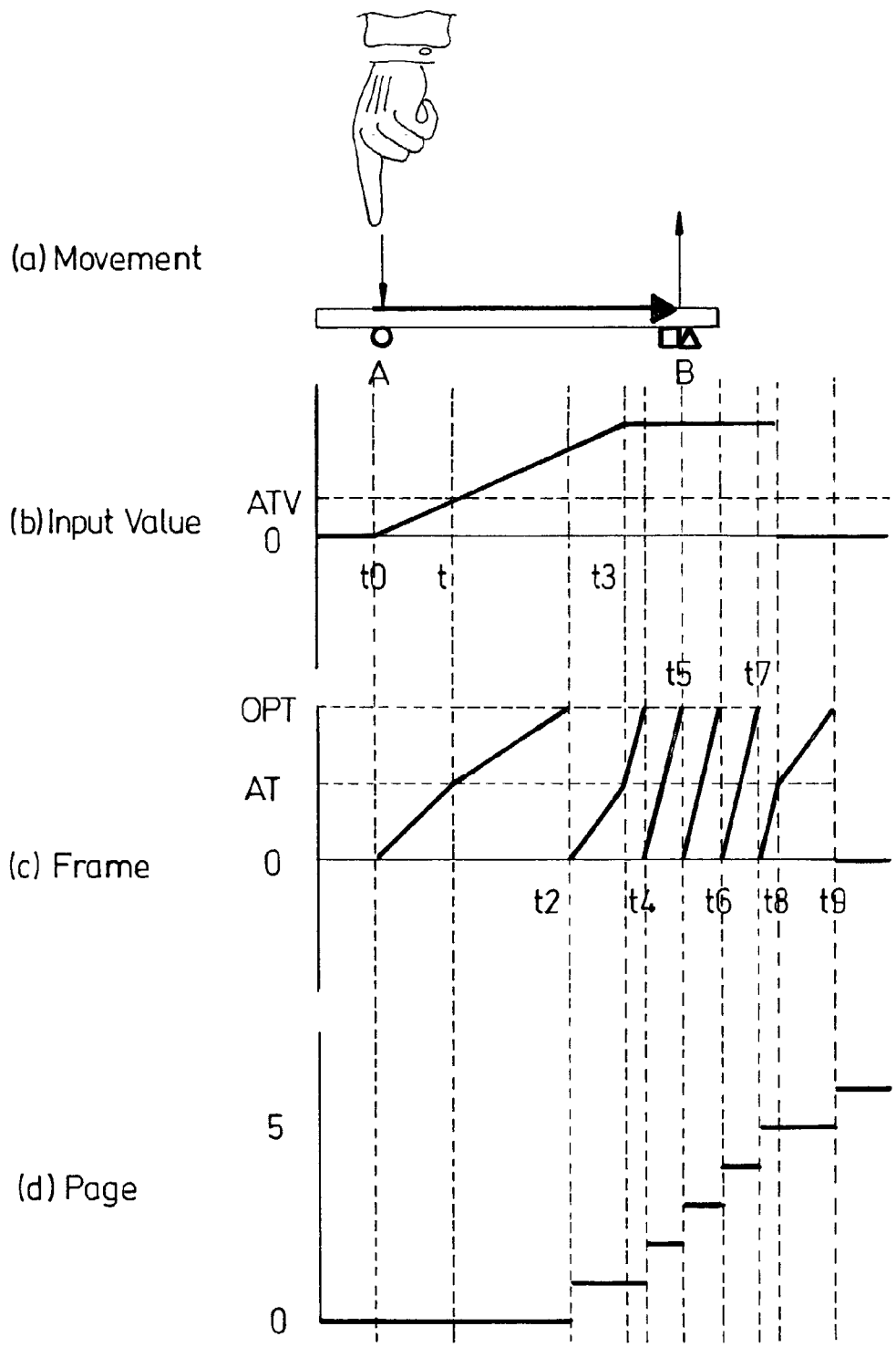
FIG. 9 illustrates a third example of operation of an embodiment of the invention for specific user input.

FIG. 9 shows an example of the turning of multiple pages, as if a reader were "rifling" through a physical book.

The user touches the touchpad at point A, moves his finger to B (where distance AB exceeds ATV) and holds his finger at B for a period of time before releasing it (see parts (a) and (b)). The finger touches the touchpad at t1, moves until t3, and is then held at B until t8.

Part (c) shows the resulting frames for display. As for Example 2, the frame displayed is proportional to V until frame AT is reached at t1. After this point, the rate of page turning is proportional to (V−ATV). Once the first page is turned (at t2), the input state is still in the "Turn Forward" state and page turning continues. The rate of page turning is determined by V—as V is increasing up until the finger stops at B, at time t3, the rate of page turning increases until t3—it then remains constant, so the intervals between successive page turns after the next page turn at t4 (that is, t4–t5, t5–t6, and t6–t7) is constant until the finger is released at t8 and V reverts to 0. The animation process then enters the "Finish Forward" state and finishes turning the current page at a predetermined (in this case, slower) rate until frame OPT is reached and the page is completely turned (at t9), at which point the animation process returns to zero. As can be seen from part (d), six pages are turned: the first at t2, the second at t4, the next three at a constant rate at t5, t6 and t7 respectively, and the last (more slowly) at t9.

As the skilled person will appreciate, many aspects of the preferred embodiments described above may be modified without departing from the invention as claimed. In particular, embodiments of the invention may be implemented on conventional computing apparatus (such as a personal computer) with appropriate programming and an appropriate source of user input. Although a digitising touchpad is a particularly appropriate source of user input, further embodiments of the invention may employ other user input sources adapted to convert appropriate user movement into digital signals, particularly such that the movement can be converted into a continuous variable.

Figure 12:
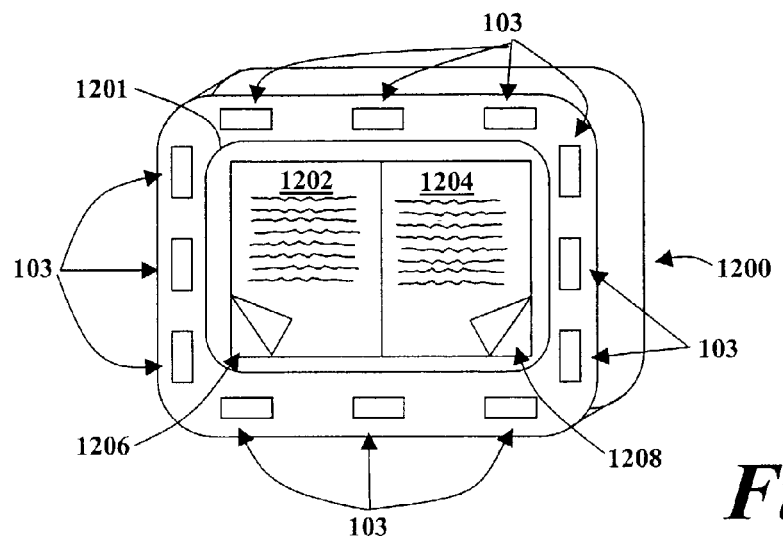
FIG. 12 schematically shows a further embodiment of the present invention.

FIG. 12 shows a document viewing device 1200 that is similar to that shown in FIG. 1, but there are more input devices 103 around the perimeter of the device 1200. The display 1201, as with the embodiment shown in FIG. 1 displays representations of two pages: a left page 1202, and a right page 1204.

FIG. 12 shows both the left 1202 and right 1204 pages being turned. That is the bottom left region 1206 of the left page 1202 and the bottom right region 1208 of the right page 1204 are shown as being partially turned.

The ability to turn pages on the opposite sides of an open book, the ability to insert fingers as a place marker in to a book, and the ability to turn blocks of pages at once is taken for granted when a reader is reading a paper based book. These functions are described and shown with reference to FIG. 13, which shows a book 1302 comprising a plurality of pages 1304. A reader has inserted a first finger 1306 of his/her left hand as a first page marker in the left pages of the open book 1302, a second finger 1308 of his/her left hand as a second place marker in the left pages of the open book 1302, and has inserted a first finger 1310 of his/her right hand as a first place maker in the right pages of the open book 1302. A second finger 1312 of the reader's right hand has been placed above the top page 1313 of the right hand pages of the open book 1302.

With such marking, which is natural to readers of conventional books, the reader can quickly refer to the portions marked by the first 1306, and second fingers 1308 of his/her left hand, or by the first finger of his/her right hand 1310. Indeed, it is possible for the reader to "flip" a block of pages 1314 from resting on the second finger 1308 of the reader's left hand so that they rest on the second finger 1312 of the reader's right hand. Such flipping allows the reader to quickly compare the top pages 1313, and 1316 (when the block 1314 is in the position shown in the Figure), with the pages 1318, and 1320 (with the pages flipped so that they rest on the second finger 1312 of the right hand). It will be appreciated that similar actions can be made other fingers, and that a reader can insert more or less fingers as markers. A reader may also use his/her thumb instead of, or as well as his/her fingers.

Figure 13:
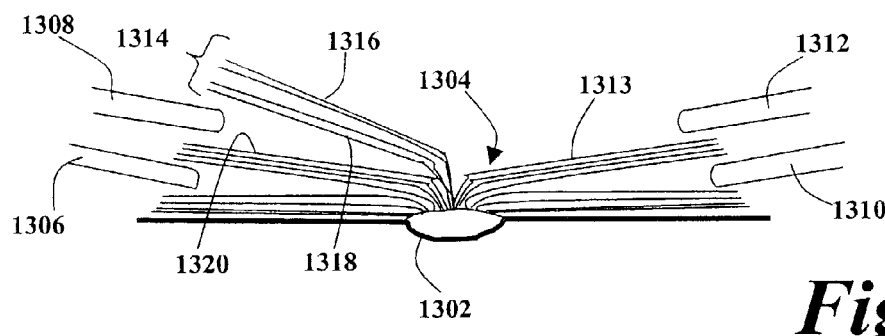
FIG. 13 schematically shows a prior art method of viewing a paper-based book.

As will now be described the embodiment of FIGS. 1 and 12 provides a user of the electronic device the functionality accepted by a reader of a paper based document as described in relation to FIG. 13.

FIG. 1 shows a simple embodiment of a document viewing device according to the present invention. As described above, it comprises two input devices 103: a first associated with the left hand page, and a second associated with the right hand page of the document viewing device. As will be appreciated from the foregoing description, if a user strokes right hand page input device 103 from d to c he/she can cause the right hand page to turn so that it lies on top of the left hand page. (as it is shown in the process of doing at region 105). This movement generates a set of co-ordinates that have a range of change with respect to time for a period. After this period of changing co-ordinates has stopped the user may maintain pressure on the input device and thus generate an input in which the co-ordinates no longer have a rate of change with time.

Likewise if a user strokes the left hand page input device 103 from a to b he/she can cause the left hand page to turn over so that it lies on top of the right hand page. The functionality of the input devices 103 is the same as described above so that if a user exceeds the threshold ATV and holds his/her finger in place the pages continuously turn (or "rifle").

Therefore, the two input devices shown can function independently, and can be used to simply turn the left and right hand pages. However, there is also a degree of interaction that is possible between the two input devices 103 of the document viewing device 100 as will now be described.

Figure 14:
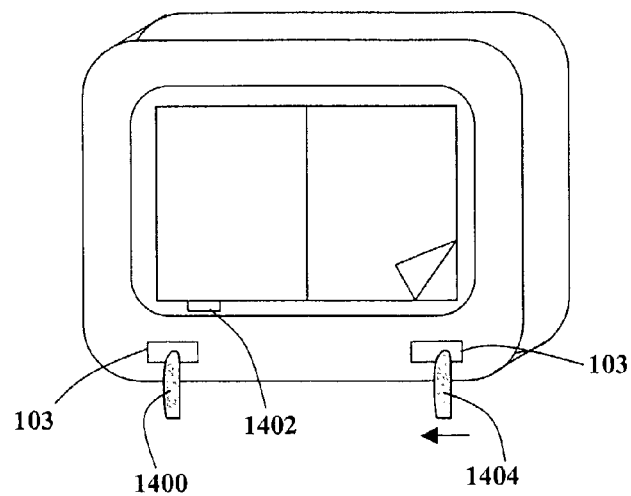
FIGS. 14 and 15a to g graphically show a method of operating the document viewing device of FIG. 1.

As shown in FIG. 14 a user can place his/her "finger" 1400 on the left hand input device 103 such that it does not move, but remains in contact with the input device 103. This generates an input that does not have a period in which the co-ordinates have a rate of change with respect to time. As such nothing happens—because there is no movement along the input device 103 no pages are turned. Statically placing a finger 1400 on the input device 103 in this manner places a reference marker into the pages and can be likened to placing a finger as a marker within the pages of a conventional book (for example like the first finger 1306 of the left hand in FIG. 13). The input device will generate a set of co-ordinates that will substantially not change with time. As the right hand input device 103 is used to turn the right hand pages onto the left side of the representation of the book, these pages stack up onto the reference marker. In this embodiment the presence of the reference marker is shown by an indicator, in this case a tab 1402 associated with a page, indicating that a block of pages are building up on the left hand side of the display (similar to the block 1314 of FIG. 13).

The right hand input device 103 can function in a similar manner. That is if a finger 1404 is placed on the right hand input device 103 and not moved, pages turned to the right, from the left hand side of the document viewing device, build up on a marker that would be placed on the right hand side.

Once at least one page has built up upon a reference marker further functionality can be provided by the input devices 103. For example if a block of pages (which may include a single page) has build up upon a marker on the left hand side of the device, moving a finger 1400 from a left to right position (as shown in the Figure) turns the entire block back onto the right hand side of the device. (The block of pages may animate in the same manner as is described above with reference to single pages.) Additionally, pages may be removed from the block of pages by making a left to right motion on the right hand input device.

Once this block of pages has been turned to the right hand side, the pages may be added to those pages on the right, or they may form a block of pages on the right hand side of the device. Which of these possible options occurs depends on whether or not a user has his/her fingers on the right hand input device 103. If the user has his/her finger placed on the right hand input device 103 then a reference marker is formed, and a block of pages is formed on top of the reference marker. If the user does not have a finger on the right hand input device 103 then the pages turned from the left are simply added on top of those already on the right (assuming there are some pages already on the right hand side).

Thus, once a block of pages has been formed by the creation of a reference marker by holding a finger (or other pointer) on an input device 103, it can be flipped back and forth from the left to the right and visa versa. As such, a user can compare the four pages that are presented (two pages when the block is on the right and two pages when the block is on the left). Pages may be riffled on to the block once it is created by moving the finger on the relevant input device 103 beyond the ATV threshold.

Figure 15A:
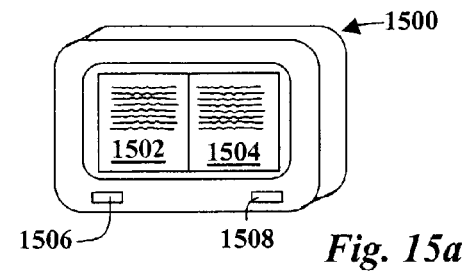

This method is shown in FIGS. 15a to g, which will now be briefly described. FIG. 15a a document viewing device 1500, displaying a left page 1502, and a right page 1504. As with the previous embodiments a left hand input device 1506 associated with the left hand page 1502, and a right hand input device 1508 associated with the right hand page 1504 are provided.

Figure 15G:
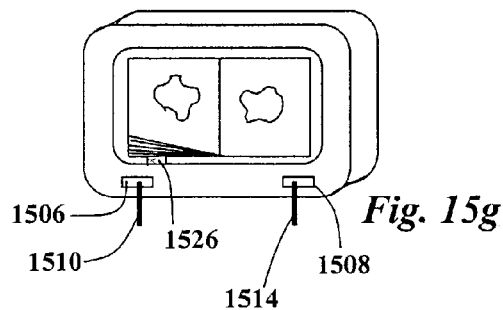
Figure 15B:
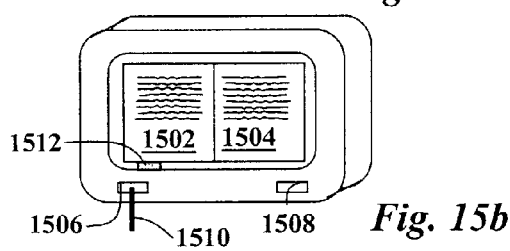

FIG. 15b shows a user placing his/her finger 1510 on a central region of the left hand input device 1506. Placing a finger in this manner provides a first predetermined input and causes a reference marker to be placed upon the left hand page 1502, and a tab 1512 appears on the display to represent this.

Figure 15C:
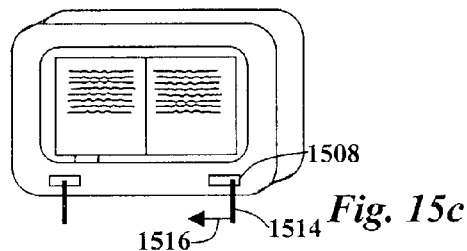

In FIG. 15c the user has placed a finger 1514 onto a right hand portion of the right hand input device 1508, and moved this finger 1514 towards the left hand portion of the input device 1508, i.e. towards the centre of the device (as indicated by the arrow 1516). In this example the user moves his/her finger beyond the ATV threshold and pages continuously move, or rifle to from the right to the left hand side.

Figure 15D:
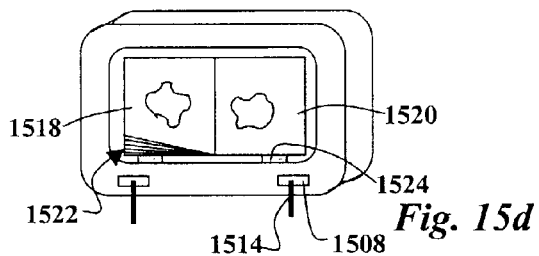
Figure 15E:
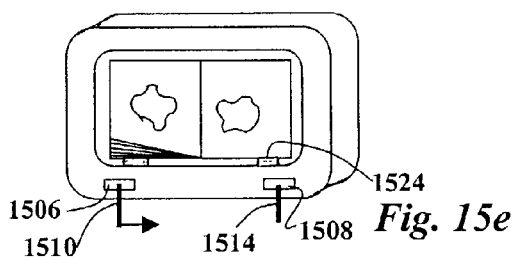

The user maintains his/her finger on the right hand input device 1508 for a period so that a plurality of pages are moved to the left hand side of the device. Eventually, as shown in FIG. 15d the user moves his/her finger back to a central region of the right hand input device 1508, and so pages stop turning. Consequently, a new left hand page 1518, and a new right hand page 1520 are displayed. The left hand side of the display is arranged to show a plurality of pages (block of pages) have built up on top of the reference marker. (Of course, in other embodiments it would be possible for a user to remove his/her finger in order to stop the pages turning, and then replace a finger in the central region of the input device to introduce a reference marker.)

In this embodiment a plurality of pages edges 1522 are shown at a bottom region of the left hand page 1518. Further, because the user has moved his/her finger 1514 to a central region of the right hand input device 1508 a first predetermined input is provided and a reference marker has been placed on the open right hand page 1520 and a tab 1524 is shown at a bottom region of the right hand page 1520 to indicate this.

Figure 15F:
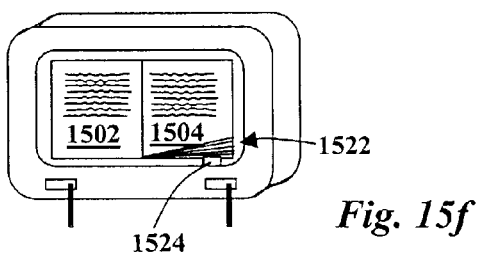

The user can now flip the block of pages between the left and right hand side of the device. As shown in FIG. 15 e, the user maintains his/her finger on a central region of the right hand input device 1508 and moves his/her finger on the left hand input device 1506 toward to a right hand portion thereof and therefor provides a second predetermined input (i.e. toward the centre of the device 1500). This causes the block pages to move onto the right hand side on top of the reference marker so that the original two pages 1502, 1504 are displayed, and is represented in FIG. 15f. FIG. 15f also shows that the page edges 1522 have moved to the right hand side of the display. It can therefore be seen that the first predetermined input may turn into the second predetermined input.

As can be seen with reference to FIG. 15g it is possible to flip the block of pages back to the left hand side of the device. A user places his/her finger 1510 at a central region of the left hand input device 1506 so that a reference marker and tab 1526 are created. Movement of the user's finger on the right hand input device 1508 causes the block of pages to move back so that the pages 1518, 1520 are displayed.

If the user were to remove his/her finger 1510, 1514 from either of the left hand 1506, or right hand 1508 input devices whilst a reference marker is present (a consequently a tab 1512, 1524 displayed) then the reference marker is removed i.e. the reference marker remains for substantially the same time as the user input is provided to the input device. Any pages built up upon the reference marker (e.g. as represented by the page edges 1522) are laid flat upon the correct side of the device.

Whilst a finger is on an input device and is causing a reference marker to be maintained on the relevant side of the device, movement of this finger toward the centre of the device causes an action to occur as described above. It will be appreciated that before movement occurs movement of the finger must exceed a predetermined threshold, which helps to ensure that pages, or blocks of pages are not turned accidentally. When the reference marker is in place, any movement of the finger in the opposite direction (i.e. away from the centre of the device) is ignored by the device.

As can be seen with reference to FIG. 12 it is possible to place many more than two input devices around the perimeter of the document viewing device 1200. Such an arrangement allows a user to place a plurality of reference markers into the pages of the document being displayed. Each of the input devices 103 may allow a reference marker to be inserted, and will function as described above noting the following. The description above talks about movement to and away from the centre of the device. It will be appreciated that some of the input devices shown in FIG. 12 are vertically orientated, and as such movement toward the centre of the device may be replaced with movement toward the top, or bottom, of the device.

What is claimed is:

1. A document display device, comprising:
    a memory and arranged to store a document in the form of a sequence of pages;
    a display capable of displaying said document and ranged to provide a user view of pages from said sequence;
    at least one user input device capable of receiving user inputs and of generating a signal based on said inputs; and
    a processor responsive to said signal and being:
        arranged to respond to said signal by changing said user view of said sequence of pages;
        arranged to associate at least one reference marker with a page by a predetermined first input to said at least one input device;
        arranged such that a page associated with said reference marker can be at least partially displayed by a second predetermined input to the input device;
        capable of determining a rate of change of said co-ordinates; and
        ranged to introduce a reference marker when a first input having substantially no change in said co-ordinates with respect to time is made to said at least one input device.

2. A document display device according to claim 1 wherein the said input device is arranged to provide co-ordinates associated with a said user input to said input device in said signal to said processor.

3. A document display device according to claim 1 wherein said reference marker exists for substantially the same length of time that said input device provides co-ordinates associated with said predetermined first input.

4. A document display device according to claim 1 wherein said at least one input device is a digitiser track pad.

5. A document display device according to claim 1 wherein said processor is arranged to cause said display to cover a page with which said reference marker has been associated with other pages such that said page with which said reference marker has been associated can substantially no longer be viewed in order to display subsequent pages in said sequence of pages.

6. A document display device according to claim 5 wherein said processor is arranged to cause said display to display at least a portion of said page with which said reference marker has been associated when said second user input is detected on said at least one input device.

7. A document display device according to claim 6 wherein said input device is arranged to provide co-ordinates associated with a said user input to said input device in said signal to said processor, said processor is capable of determining a rate of change of said co-ordinates and said processor is arranged to cause said display to display at least a portion of said page with which a reference marker has been associated when said second user input generates co-ordinates having a rate of change with respect to time.

8. A document display device according to claim 7 wherein said processor is arranged to cause said display to display said page with which a reference has been associated in substantially its entirety when a change of co-ordinates generated by said second input exceeds a predetermined threshold.

9. A document display device according to claim 8 wherein said processor is arranged such that when said second input does not generate a change of co-ordinates exceeding said predetermined threshold and is subsequently removed said display is caused to revert to displaying the pages that were covering said page with which a reference has been associated.

10. A document display device according to claim 1 wherein said processor is capable of causing said display to display an indicator of said reference marker and wherein said processor is arranged to cause the display to display said indicator to indicate that said reference marker has been introduced.

11. A document display device according to claim 1 wherein said device comprises at least two user input devices.

12. A document display device according to claim 1 wherein said pages are ranged to have a front face and a back face and said processor is arranged to change said display such that successive views provide a view of only one of said front face and said back face of a page and wherein said processor is further arranged to change said display to display intermediate views between said successive views of said sequence of pages.

13. A document display device according to claim 12 wherein said intermediate views are arranged to present part of both said front face and a part of said back face of at least one page to a user.

14. A method of facilitating the retrieval of information comprising;
providing a user with a device comprising a display capable of displaying a view of at least one page from a sequence of pages and further comprising an input device capable of receiving a user input;
allowing a user to introduce a reference marker onto said at least one displayed page by making a first input to said input device that corresponds to a substantially zero rate of change with respect to time of co-ordinates that is generated by said input device, and further arranged so that the page on which the reference marker has been placed can be at least partially displayed when a user makes a second predetermined input to said input device.

15. A method according to claim 14 comprising providing said input device such tat it is capable of generating co-ordinates associated wit a user input.

16. A method according to claim 15 comprising using said co-ordinates provided by a second input to said input device to determine whether a portion of the page on which a reference marker has been placed should be displayed.

17. A method according to claim 16 comprising applying a threshold parameter to said co-ordinates provided by the said second input to said input device, such that if said threshold is exceeded said page on which said reference marker has been placed is displayed substantially in its entirety.

18. A method according to claim 17 comprising causing said display to revert to the page displayed before a portion of said page on which a reference marker has been placed was displayed if said second user input is removed before said threshold is exceeded.

19. A computer readable medium having contained therein instructions for causing a processor to execute the method of claim 14.

20. A document display device, comprising;
a memory arranged to store a document in the form of a sequence of pages;
a display capable of displaying said document and arranged to provide a user view of pages from said sequence;
at least one user input device capable of receiving inputs and of generating a signal based on said user inputs containing co-ordinates associated with said user input to said at least one user input device; and
processing circuitry arranged to receive said signal and to detect a change in said co-ordinates, said processing circuitry being arranged to respond to said signal to change said user view of said sequence of pages and wherein said processing circuitry is arranged to associate reference markers with a page when a first input having substantially no change in said co-ordinates with respect to time is made to said at least one input device and further arranged such that a page associated with said reference marker can be at least partially displayed by a second predetermined input to the input device.

21. A document display device, comprising;
a memory means for storing data, said memory means being arranged to store data in the form of a document comprising a sequence of pages;
a display means for displaying said data, said display means being arranged to provide a user view of pages from said sequence;
at least one user input means for receiving user inputs and for generating a signal based on said user inputs, said user input means arranged to provide co-ordinates associated with a user input; and
a processing means for processing data and arranged to receive said signal and to alter said display, said processing means being:
arranged to respond to said signal by changing said user view of said sequence of pages and said processing means;
arranged to associate at least one reference marker wit a page by a predetermined first input to said at least one input means; and
arranged such tat a page associated with said reference marker can be at least partially displayed by a second predetermined input to the input means;
capable of determining a rate of change of said coordinates; and
arranged to introduce a reference marker when a first input having substantially no change in said co-ordinates with respect to time is made to said at least one input device.

22. A document display device, comprising;
a memory arranged to store a document in the form of a sequence of pages;
a display capable of displaying selected pages of said sequence of pages;
a first input device capable of detecting movement and position of a user's finger over the first input device, wherein when the first input device detects the user moving a finger over the first input device, the display simulates turning of at least one page in a first direction at a rate corresponding to a rate of movement of the finger, and a second input device capable of detecting movement and position of another user's finger over the second input device, wherein when the second input device detects the user moving the other finger over the second input device, the display simulates turning of at least one page in a second direction at a rate corresponding to a rate of movement of the other finger, such that when the first input device detects the user statically placing their finger on the first input device, a reference marker is associated with a displayed page that is associated with the first input device, and such that the reference marker is displayed on the displayed page.

23. A document display device according to claim 22 wherein when the second input device detects the user moving their other finger over the second input device, the display simulates turning of at least one page over the page associated with the displayed reference marker.

24. A document display device according to claim 22 wherein said first input device and said second input device are a touchpad device.

25. A method of viewing a sequence of displayed pages of a document, comprising: displaying a first page of the document and a consecutive second page of the document; sensing movement and position of a user's finger over a first input device; and displaying a reference marker associated with a displayed page that is associated with the first input device when no motion of the user's finger is sensed; sensing movement and position of another finger over a second input device; detecting the user moving their other finger over the second input device; and displaying 2 an animation of turning of at least one page over the page associated with the displayed reference marker at a rate corresponding to a rate of movement of the other finger.

26. A document display device according to claim 25 further comprising: sensing motion of the user's first finger on the first input device; and displaying another animation of returning back to a display of the page associated with the displayed reference marker.

* * * * *